L. A. PAPE.
DYNAMO ELECTRIC MACHINE.
APPLICATION FILED AUG. 19, 1907.
927,274.
Patented July 6, 1909.
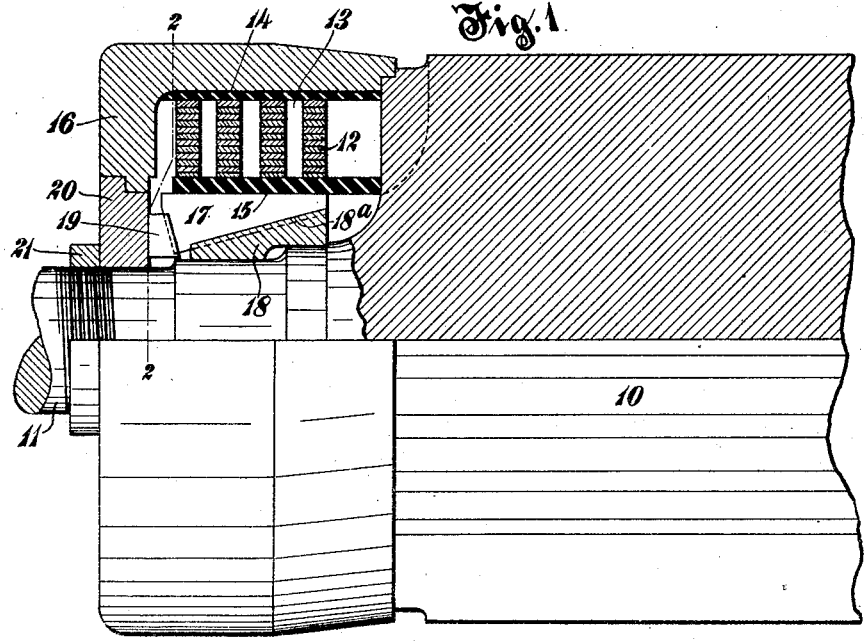
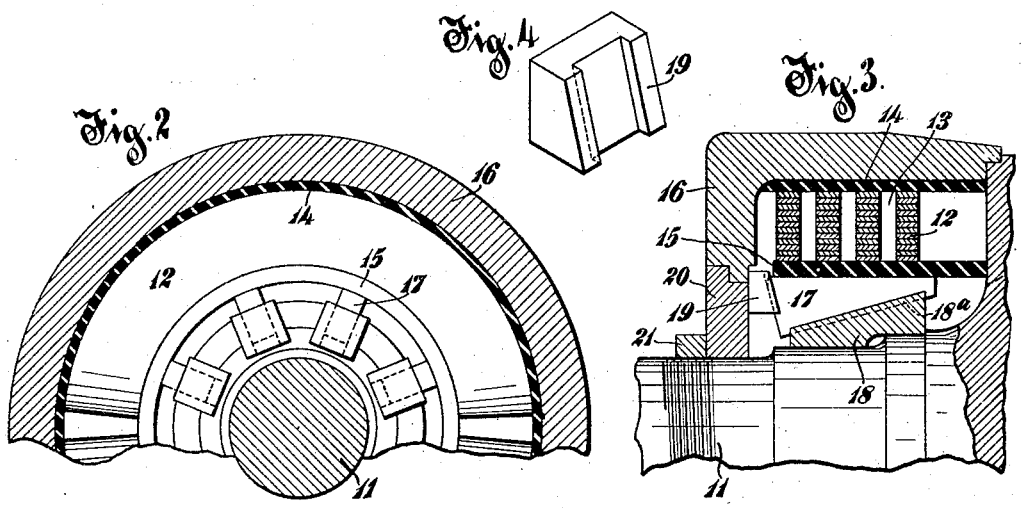
Witnesses
Inventor
Laurence A. Pape
By Chas. E. Lord
Attorney

UNITED STATES PATENT OFFICE.

LAURENCE A. PAPE, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 927,274.  Specification of Letters Patent.  Patented July 6, 1909.

Application filed August 19, 1907. Serial No. 389,117.

*To all whom it may concern:*

Be it known that I, LAURENCE A. PAPE, a citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines, and especially to means for automatically tightening the current carrying coils of the rotating members thereof.

In high speed dynamo-electric machines, such as turbo-generators, it has been found that sometimes during the operation of the machine the current carrying coils of the rotating member become loosened. This may be caused by shrinking of the insulation between said coils upon being heated, and by compression of said insulation and perhaps also of the coils themselves by the action of centrifugal force. This loosening is most often found in the end-turns of the coils. In cases where wedges are used for tightening the end-turns and holding them in place, all that is necessary in order to make the loosened coils tight again is to drive said wedges farther in.

It is the object of my present invention to provide means for automatically tightening coils which become loosened. With my invention this is accomplished by an automatic follow-up device, which is preferably operated by the action of the same centrifugal force which may tend to loosen the coils. In the preferred embodiment of my invention the centrifugal force acts through radially movable wedges to drive in the longitudinally movable wedges which hold the end-turns in place. However, many other desired means may be used and still come within the broad scope of my invention.

The novel features of my invention will appear in the following description and accompanying drawing and will be particularly pointed out in the claims.

Figure 1 shows a partial longitudinal section of the rotor of a dynamo-electric machine in which my invention is embodied; Fig. 2 is a section on the line 2—2 of Fig. 1, with the end turns partly broken away; Fig. 3 is a fragmentary view somewhat similar to Fig. 1, showing the coil-tightening wedges in another position; and Fig. 4 is an isometric view of one of the wedges.

The body 10 of the rotating member of a dynamo-electric machine is provided with a shaft or shaft projection 11. In this case this rotating member is the field member and is slotted longitudinally to receive the usual field windings, the end-turns of said field windings being shown at 12. As here shown these windings are of edgewise wound strap conductor. The end-turns of different groups of windings are separated by insulating blocks 13, and insulation 14 and 15 is provided at the outer and inner surfaces of the end-turns. An end-ring 16 at each end surrounds the end-turns 12 and holds them in place. The end-turns are held against the end rings and are tightened by longitudinally movable wedges 17 driven in between them and the conical wedge support 18 in grooves $18^a$ of the latter.

In assembling the machine, after the longitudinally movable wedges 17 have been driven in as far as possible, grooved radially movable wedges 19 are placed against and over their ends and are held in place by a collar 20, fitting closely around the shaft 11 and itself held in place by a nut 21. The two sets of wedges form the automatic follow-up device for tightening the end-turns.

In the operation of the machine the action of the same centrifugal force which may help to cause the end-turns 12 to become loosened, forces the radially movable wedges 19 outwardly from the position shown in Fig. 1 toward that shown in Fig. 3. This outward movement of the radially movable wedges 19 forces the longitudinally movable wedges 17 farther into place, causing them immediately to tighten up the coils if the latter have become loosened. The angles of the wedges 17 and 19 are preferably no greater than the angle of repose of the materials of which they are made, so that when the machine is stopped the wedges do not return to their initial positions.

Many modifications in the precise arrangement here shown and described may be made without departing from the spirit and scope of my invention and all such I aim to cover in the following claims:—

What I claim as new is:—

1. In a rotatable member for dynamo-electric machines, the combination with a magnetic structure and conductors associated therewith, of means for automatically tightening said conductors during the operation of the machine.

2. In a rotatable member for dynamo-electric machines, the combination with a magnetic structure and conductors associated therewith, of centrifugally operated means for tightening said conductors.

3. In a rotatable member for dynamo-electric machines, the combination of a slotted magnetic structure, conductors in and projecting beyond said slots, wedges for tightening the parts of the conductors which extend beyond said slots, and automatic means for moving said wedges in the direction of their smaller ends.

4. In a rotatable member of a dynamo-electric machine, the combination of a slotted magnetic structure, coils in and projecting beyond said slots, an end ring inclosing the projecting parts of said coils, wedges within said coils, and automatic means for properly moving said wedges to tighten the projecting parts of said coils against said end ring.

5. In a rotatable member of a dynamo-electric machine, the combination of a slotted magnetic structure, conductors in and projecting beyond said slots, and centrifugally operated means for tightening the projecting parts of said conductors.

6. In a rotatable member of a dynamo-electric machine, the combination of a magnetic structure, coils in and projecting beyond said structure, an end-ring for holding the projecting parts of said coils in place, wedges within said coils for forcing them outwardly, and centrifugally operated means for tightening said wedges.

7. In a rotor of a dynamo-electric machine, the combination of a slotted magnetic structure, coils in the slots thereof, said coils having projecting end-turns, an abutment, wedges for tightening said coils against said abutment, and other wedges acted upon by centrifugal force to drive said first wedges into place.

8. In a rotatable member of a dynamo-electric machine, the combination of a rotatable slotted magnetic structure, coils in the slots thereof, said coils being provided with end-turns or connections, an end ring inclosing said end-turns, and automatic means for tightening said end-turns against said end ring while the machine is in operation.

9. In a rotatable member of a dynamo-electric machine, the combination of a slotted magnetic structure, coils in and projecting beyond said slots, and an automatic follow-up device for tightening the projecting parts of said coils as they become loose in the operation of the machine.

10. In a rotatable member for dynamo-electric machines, the combination with a magnetic structure and conductors associated therewith, of means operated by the rotation of said member for tightening said conductors.

11. In a rotatable member for dynamo-electric machines, the combination with a magnetic structure and conductors associated therewith, of means operated by centrifugal force while the machine is in operation for tightening said conductors as they become loose.

In testimony whereof I affix my signature, in the presence of two witnesses.

LAURENCE A. PAPE.

Witnesses:
GEO. B. SCHLEY,
FRED J. KINSEY.